(12) United States Patent
Cho et al.

(10) Patent No.: US 7,376,723 B2
(45) Date of Patent: May 20, 2008

(54) APPARATUS AND METHOD FOR MANAGING AND CONTROLLING UPNP DEVICES IN HOME NETWORK OVER EXTERNAL INTERNET NETWORK

(75) Inventors: Chunglae Cho, Daejon (KR); Kwang Roh Park, Daejon (KR); Yeon Ju Oh, Daegu (KR); Kyung Shik Lim, Daegu (KR); Dong Hee Kim, Daegu (KR); Kyung Ho Chae, Daegu (KR); Hyoung Su Kim, Kyungsan (KR)

(73) Assignee: Electronics and Telecommunications Research Institute (KR)

( * ) Notice: Subject to any disclaimer, the term of this patent is extended or adjusted under 35 U.S.C. 154(b) by 969 days.

(21) Appl. No.: 10/228,125

(22) Filed: Aug. 26, 2002

(65) Prior Publication Data

US 2003/0217136 A1 Nov. 20, 2003

(30) Foreign Application Priority Data

May 16, 2002 (KR) ................................ 2002-27176

(51) Int. Cl.
*G06F 15/173* (2006.01)
*G06F 7/00* (2006.01)
(52) U.S. Cl. ...................................... 709/223; 709/218
(58) Field of Classification Search ........ 709/223–224, 709/218; 717/118, 120
See application file for complete search history.

(56) References Cited

U.S. PATENT DOCUMENTS 6,725,281 B1 * 4/2004 Zintel et al. ................. 719/318

(Continued)

FOREIGN PATENT DOCUMENTS

EP 1 058 422 A1 * 6/2000

(Continued)

OTHER PUBLICATIONS

The Jini architecture for network-centric computing, Jim Waldo, Commun. ACM, vol. 42, No. 7, 1999, ISSN 0001-0782, pp. 76-82.*

(Continued)

*Primary Examiner*—Zarni Maung
(74) *Attorney, Agent, or Firm*—Blakely, Sokoloff, Taylor & Zafman

(57) ABSTRACT

An apparatus and method for managing and controlling UPnP devices in a home network over an external Internet network. The apparatus comprises a client connected to the external Internet network, and a UPnP proxy server for controlling and managing the UPnP devices in the home network. The client includes a stub for providing the same application program interface (API) as a UPnP API to a user, managing information of the UPnP devices and processing a device control command from the user, and a push client for transferring the device control command processed by the stub to the UPnP proxy server and an event message from the UPnP proxy server to the stub, respectively. The UPnP proxy server includes a bridge for managing the UPnP devices in the home network and controlling a specific one of the UPnP devices in response to the device control command from the client, and an agent for transferring the device control command from the client to the bridge and a result of execution of the device control command and the event message from the bridge to the client, respectively.

5 Claims, 8 Drawing Sheets

U.S. PATENT DOCUMENTS

2002/0112058 A1* 8/2002 Weisman et al. ........... 709/227

FOREIGN PATENT DOCUMENTS

| EP | 1058422 A1 | 12/2000 |
| KR | 1020010018115 | 3/2001 |
| WO | WO 01 01632 A3 * | 1/2001 |

OTHER PUBLICATIONS

Protocols for Service Discovery in Dynamic and Mobile Networks, C. Lee & S. Helal, Intl Journal of Comp. Research, Special Issue on Wireless Systems and Mobile Computing, 2002.*

Universal Plug and Play in Windows XP, Fout, T., Microsoft TechNet, Jul. 2001, pp. 1-19.*

Multimedia Middleware for Future Home, Baler, et al., Intl. Multimedia Conf. archive Proc. of the 2001 Intl workshop on Multimedia middleware, Canada, 2001, p. 48-51, ISBN:1-58113-396-0.*

Embedded internet systems come home, Filman, R.E., RIACS; Internet Computing, IEEE, Jan./Feb. 2001 vol. 5, Issue: 1, pp. 52-53, ISSN:1089-7801.*

WebSplitter: a unified XML framework for multi-device collaborative Web browsing, Comp. Supported cooperative Work archive Proc. 2000 ACM conf. Philadelphia, Pennsylvania, pp. 221-230, 2000.*

A Publication of the International Association for Computer and Information Service; "Accessing UPnP Devices in Private Networks from Internet with UPnP Directory Server", C. Cho et al., 7 pages.

* cited by examiner

APPARATUS AND METHOD FOR MANAGING AND CONTROLLING UPNP DEVICES IN HOME NETWORK OVER EXTERNAL INTERNET NETWORK

BACKGROUND OF THE INVENTION

1. Field of the Invention

The present invention relates to the management and control of UPnP devices in a home network, and more particularly to an apparatus and method for managing and controlling UPnP devices in a home network over an external Internet network, wherein the external Internet network has the same communication environments as those of the home network so that the UPnP devices in the home network can be managed and controlled from the external Internet network, and a computer-readable storage medium for storing a program for execution thereof.

2. Description of the Prior Art

With the popularization of the Internet, recently, the demand for the Internet in general homes has become widespread. In order to meet this demand, application program developers have developed application programs capable of controlling and managing devices in a home network using home network middleware technologies such as Jini and UPnP, thereby enabling users to manage and control home appliances or security systems in their homes. The UPnP has been proposed as one of the middleware technologies in UPnP Forum, which is a community of two hundred and some companies in various fields, such as home appliances, computers, home automation, mobile devices, etc., founded on Oct. 18, 1999. This Forum has established and published standards of devices and services on the basis of Internet-based communication standards for the purpose of easily and simply constructing networks associated with the devices in homes or offices and controlling the devices over the constructed networks.

A system has been conventionally proposed to control and manage devices in a home network using the UPnP technology. This control/management system comprises a user interface, a UPnP application program interface (referred to hereinafter as API), and a control point. A user can control a specific one of the devices in the home network in such a manner that the user inputs a control command associated with the specific device through the user interface and UPnP API and the control point actually controls the specific device in response to the inputted control command.

However, because the user interface, UPnP API and control point are all present in one system as mentioned above, it is not possible for the user to control the devices in the home network using the system when he/she is beyond the home network. On the other hand, the control point acquires all information necessary for the control of the devices in the home network from advertisement messages sent from the devices. Note that the advertisement messages periodically sent from the devices in the home network can be received only within a limited range. In this regard, as the user is farther from the home network, the probability that the sent advertisement messages will be received is lower.

It is anticipated that the home network will be made of a private network due to depletion of IPv4. In the case where the home network is made of the private network, the advertisement messages from the devices are not sent to the outside of the home network, so the user cannot receive the advertisement messages even when he/she is in the vicinity of the home network. Also, device control commands from the control point cannot be sent to the home network. For this reason, it is impossible for the conventional control/management system to control and manage the UPnP devices in the home network over an external Internet network.

A brief description will hereinafter be given of a conventional method wherein a public network UPnP client controls private network devices. A method for accessing UPnP devices in a private network from an Internet network with a UPnP directory server is disclosed in a reference thesis (Chunglae Cho, Jaemyung Kim and Kwangroh Park, "Accessing UPnP device in Private Networks from Internet with UPnP Directory Server", Proc. 1st ACIS Annual ICIS'01, Vol. 1, No. 1, pp. 65-70, October 2001). This method is adapted to control UPnP devices with private Internet protocol (IP) addresses in a home network over the Internet by providing on the Internet a UPnP directory server that translates uniform resource locator (URL) information in device descriptions of the UPnP devices by way of a network address translation (NAT) technology and provides the translated information to a client on an external Internet network. The above thesis has also proposed a scheme for extending a simple service discovery protocol (SSDP) to allow the client on the external Internet network to browse UPnP device information on the directory server in a unicast manner. In this method, however, the client on the external Internet network interacts with the directory server only up to a device discovery step. In particular, communication can be conducted between the external client and the UPnP directory server by translating a network address using the NAT and modifying (extending) the UPnP SSDP.

On the other hand, an apparatus and method for bridging between an HAVi sub-network and a UPnP sub-network are shown in European Patent No. EP 1 058 422 A1. In this patent, an HAVi device controls a UPnP device through the use of a sub-network bridging unit that declares the UPnP device an HAVi DCM and a UPnP service an HAVi FCM, respectively.

Korean Patent Application No. 1999-33936 discloses a method for connection between a private network and a global network by a router. In this method, the router is adapted to connect the private network and the global network with each other using the NAT. A public network host can access a private network host by means of the NAT.

However, the above-mentioned preceding patents disclose various methods for accessing and controlling UPnP devices, but show no method for controlling and managing UPnP devices in a home network from an external Internet network. Although the above reference thesis shows a method for controlling and managing UPnP devices in a home network over an external Internet network, an external client interacts with a directory server only up to a device discovery step. In particular, this method has the trouble of having to translate URL information using the NAT and modify (extend in this specification) a UPnP SSDP. This method is further disadvantageous in that the external Internet network does not have the same communication environments as those of the home network.

SUMMARY OF THE INVENTION

Therefore, the present invention has been made in view of the above problems, and it is an object of the present invention to provide an apparatus and method for managing and controlling UPnP devices in a home network over an external Internet network, wherein the external Internet network has the same communication environments as those of the home network so that the UPnP devices in the home network can be managed and controlled over the external Internet network from anywhere or at any time, and a computer-readable storage medium for storing a program for execution thereof.

It is another object of the present invention to provide a UPnP device management/control apparatus which is capable of providing a user with device information necessary for the control of a specific UPnP device, controlling the specific UPnP device in response to an associated device control command from the user and, whenever the specific UPnP device is changed in its state, informing the user of the changed state.

In accordance with one aspect of the present invention, the above and other objects can be accomplished by the provision of an apparatus for managing and controlling UPnP devices in a home network over an external Internet network, comprising a client connected to the external Internet network, and a UPnP proxy server for controlling and managing the UPnP devices in the home network, wherein the client includes: a stub for providing the same application program interface (API) as a UPnP API to a user, managing information of the UPnP devices and processing a device control command from the user; and a push client for transferring the device control command processed by the stub to the UPnP proxy server and an event message from the UPnP proxy server to the stub, respectively; and wherein the UPnP proxy server includes: a bridge for managing the UPnP devices in the home network and controlling a specific one of the UPnP devices in response to the device control command from the client; and an agent for transferring the device control command from the client to the bridge and a result of execution of the device control command and the event message from the bridge to the client, respectively.

In accordance with another aspect of the present invention, there is provided a method for managing and controlling UPnP devices in a home network over an external Internet network using a UPnP proxy system which has a client connected to the external Internet network, and a UPnP proxy server for controlling and managing the UPnP devices in the home network, the method comprising the steps of: a) allowing the UPnP proxy server to discover the UPnP devices in the home network, acquire information of the UPnP devices, create a device list on the basis of the acquired information and create a Web page of the created device list; b) allowing the client to select a specific one of the UPnP devices, to be controlled by a user, from the Web page and acquire information of the selected specific UPnP device; c) allowing the proxy server to register an event with respect to the specific UPnP device and control the specific device in response to a device control command from the client; d) allowing the proxy server to receive an event message from the specific UPnP device in response to a change in state of the specific device and send the received event message to the client; and e) ending the control for the specific UPnP device and releasing the event registration.

In accordance with yet another aspect of the present invention, there is provided a computer-readable storage medium for storing a program configured to execute a method for managing and controlling UPnP devices in a home network over an external Internet network using a UPnP proxy system which has a client connected to the external Internet network, and a UPnP proxy server for controlling and managing the UPnP devices in the home network, the method comprising the steps of: a) allowing the UPnP proxy server to discover the UPnP devices in the home network, acquire information of the UPnP devices, create a device list on the basis of the acquired information and create a Web page of the created device list; b) allowing the client to select a specific one of the UPnP devices, to be controlled by a user, from the Web page and acquire information of the selected specific UPnP device; c) allowing the proxy server to register an event with respect to the specific UPnP device and control the specific device in response to a device control command from the client; d) allowing the proxy server to receive an event message from the specific UPnP device in response to a change in state of the specific device and send the received event message to the client; and e) ending the control for the specific UPnP device and releasing the event registration.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
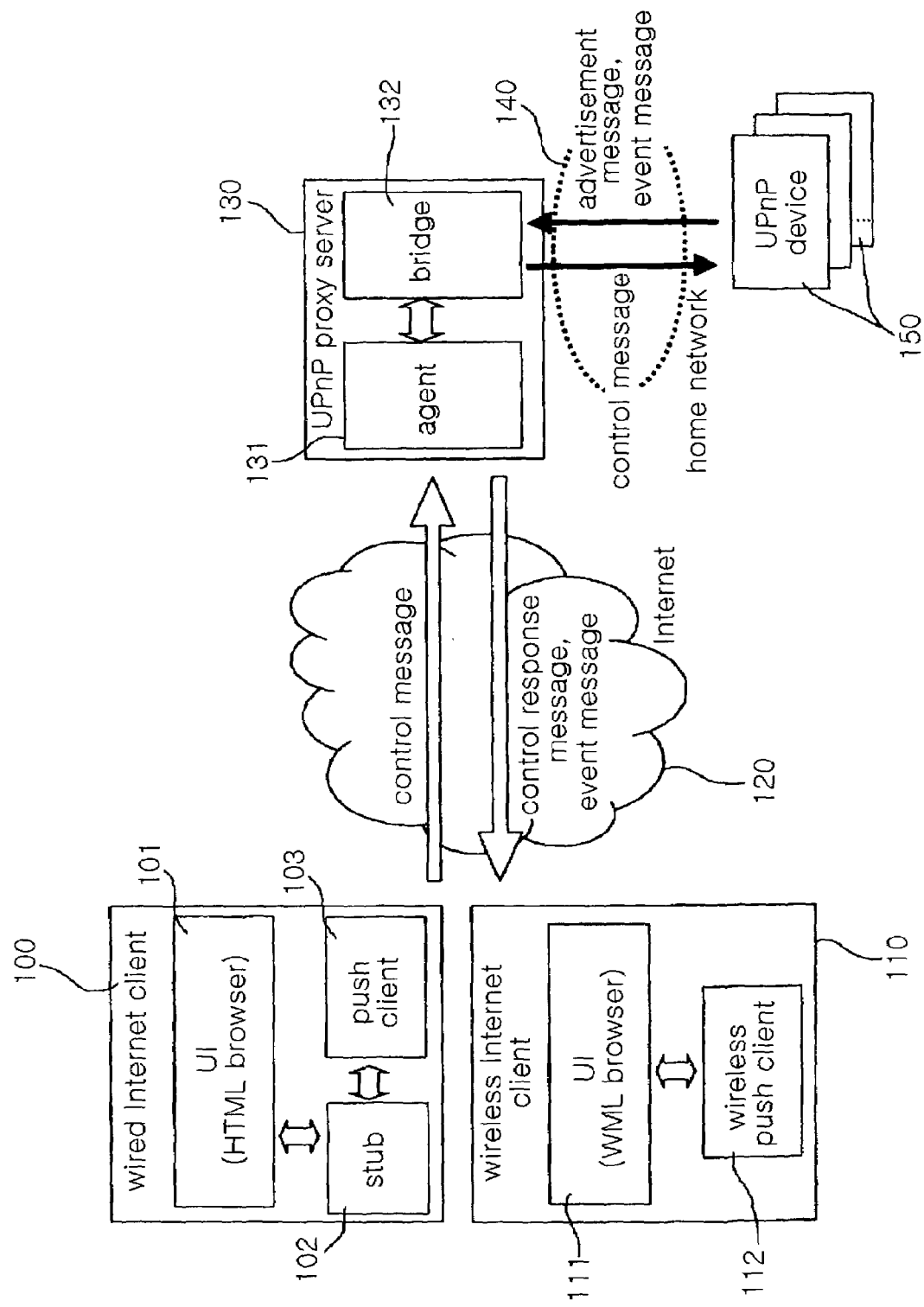
FIG. 1 is a block diagram schematically showing the entire construction of a UPnP proxy system in accordance with the present invention.

With reference to FIG. 1, there is schematically shown in block form the entire construction of a UPnP proxy system in accordance with the present invention, which is a proxy system for a home gateway designed to allow a user to control UPnP devices 150 in a home network 140 over an external Internet network using a wired/wireless Internet client 100 or 110. As shown in this drawing, the UPnP proxy system comprises a UPnP proxy server 130 and the wired/wireless Internet client 100 or 110. The UPnP proxy server 130 includes an agent 131 for receiving a command from the client 100 or 110 on the Internet 120 and sending an executed result of the received command and an event message to the client 100 or 110, and a bridge 132 for managing the UPnP devices 150 in the home network 140 and communicating with the UPnP devices according to a UPnP protocol. The bridge 132 is adapted to send control messages to the UPnP devices 150 in the home network and receive advertisement messages and event messages from the UPnP devices 150. The wired Internet client 100 includes a stub 102 for providing the same API as a UPnP API to the user and processing a control command from the user, and a push client 103 for receiving the event message sent from the agent 131. And the wireless Internet client 110 includes an UI 111 for the wireless Internet user and the wireless push client 112.

If the bridge 132 discovers the UPnP devices 150 in the home network 140, acquires information thereof and sends the acquired information to the agent 131, then the agent 131 creates a list of controllable ones of the UPnP devices 150 on the basis of the sent information. The user acquires information of a desired device to be controlled, among the controllable devices, from the agent 131, registers an event with respect to the desired device on the basis of the acquired information and re-sends a control command to the agent 131. Then, the bridge 132 controls the desired device in response to the control command from the user.

Provided that the desired device is changed in its state, the bridge 132 sends an event message to the push client 103. If the user closes or moves to different page in order to end the device control operation, the Upnp stub 102 sends the event registration release request message to the agent 113, receives the response message, and ends the entire device control operation.

Figure 2:
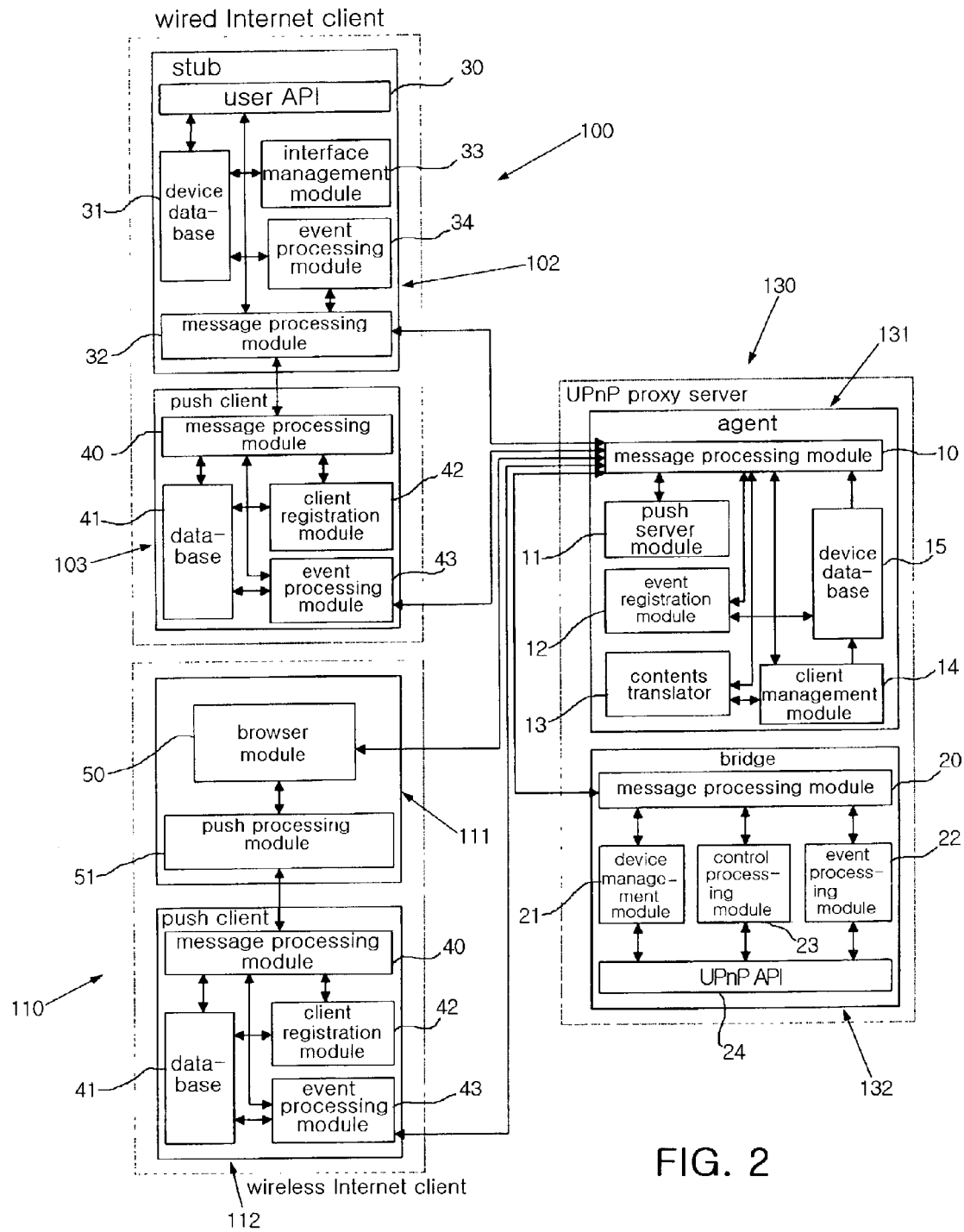
FIG. 2 is a detailed block diagram of the UPnP proxy system in accordance with the present invention.

FIG. 2 is a detailed block diagram of the UPnP proxy system in accordance with the present invention. As shown in this drawing, the UPnP proxy system comprises the UPnP proxy server 130 including the agent 131 and bridge 132, the wired Internet client 100 for Windows, and the wireless Internet client 110. The agent 131 includes a message processing module 10, a push server module 11, an event registration module 12, a contents translator 13, a client management module 14 and a device database 15.

The message processing module 10 is adapted to conduct communications with the clients 100 and 110, the bridge 132 and a different Web server, analyze a message sent thereto and transfer the sent message to an appropriate module as a result of the analysis.

The event registration module 12 is adapted to receive an event registration message from the client 100 or 110, analyze environments and performance of the client on the basis of the received event registration message and store the analysis results in the client management module 14.

The client management module 14 is adapted to store and manage information of a client which has sent the event registration message thereto, and, before sending a Web page to the client, determine from the stored and managed information whether the Web page will be processed by the contents translator and then sent to the client, or be sent directly to the client.

The push server module 11 is adapted to receive an event message from the bridge and send the received event message to the push client 103 or the wireless push client 112 in the wired/wireless client 100 or 110 according to an HTTP protocol. This module actively sends the event message to the client even though the client does not request the message explicitly.

The contents translator 13 is adapted to, when the agent 31 initiates its operation or when the UPnP devices in the home network are changed in their connections, receive a device list from the bridge 132 and translate the received device list into a Web page recognizable by the client. The contents translator 13 also acts to translate a Web page, sent from a different Web server in response to a request from the wireless Internet client, into a text format appropriate to the wireless Internet client.

The device database 15 is adapted to store and manage presentation pages of the UPnP devices in the home network and presentation pages describing services and parameters associated with the device presentation pages so that they can be used for the wireless Internet client 110. The device database 15 also acts to, when an event occurs, update an associated presentation page with a device state parameter described in the event.

The bridge 132 includes a message processing module 20, a device management module 21, an event processing module 22, a control processing module 23 and a UPnP API 24.

The message processing module 20 is adapted to conduct communications with the agent and the UPnP devices in the home network, analyze a message sent thereto and transfer the sent message to an appropriate module as a result of the analysis.

The UPnP API 24 is a module for defining operations frequently performed for the management and control of the UPnP devices in the home network. The other modules collect information and control the devices by using the API.

The device management module 21 is adapted to receive advertisement messages periodically sent from the UPnP devices in the home network, manage a device list on the basis of the received advertisement messages and, when a new UPnP device is additionally provided in the home network, receive a device description from the new UPnP device.

The control processing module 23 is adapted to receive a control command from the client through the agent and actually control an associated device in response to the received control command. The control processing module 23 controls the associated device through the UPnP API and receives a control result response therefrom. Then, the control processing module 23 sends the received control result response to the agent 131 through the message processing module 20.

The event processing module 22 is adapted to, when a specific one of the UPnP devices in the home network is changed in its state, receive and process an event message sent from the specific UPnP device. Namely, upon receiving the event message from the specific UPnP device, the event processing module 22 sends it to the agent 131 through the message processing module 20.

The stub 102 in the wired Internet client 100, which provides an API to a user program, includes a user API 30, a device database 31, a message processing module 32, an interface management module 33 and an event processing module 34.

The user API 30 is adapted to transfer the same results as those in a UPnP API provided in Windows in the same names as those in the UPnP API to the user, but to enable the client to use the various modules in the stub 102 to acquire device information and control the UPnP devices in the home network on the basis of the acquired device information even when the client is present on an Internet network beyond the home network.

The message processing module 32 is adapted to conduct communications between the agent 131 and the push client 103 according to an HTTP protocol, analyze a message sent thereto and transfer the sent message to an appropriate module as a result of the analysis.

The device database 31 is adapted to, when the user desires to control a specific one of the UPnP devices in the home network, request a device description and service description of the specific device from the agent and store all information of the specific device.

The interface management module 33 is adapted to manage an interface that the user newly creates using an API to initialize a program when ending the program.

The event processing module 34 is adapted to receive and process an event message from the push client 103. That is, the event processing module 34 reads a device state parameter described in the received event message, calls a callback function registered by the user and informs the user of the type of an event occurred in an associated device. At this time, the event processing module 34 converts the type of the read device state parameter into that appropriate to the user with reference to device state parameter type information and device state parameter name information from the device database 31 and then transfers the converted result to the user's callback function.

The push client 103 includes a message processing module 40, a database 41, a client registration module 42 and an event processing module 43.

The message processing module 40 is adapted to conduct communications with the push server module 11 in the agent 131 and the stub 102 or the wireless Internet client 110, analyze a message sent thereto and transfer the sent message to an appropriate module as a result of the analysis.

The database 41 is adapted to store information of clients desiring to receive push messages from the push client. This information is created by the client registration module 42 and used by the event processing module 43.

The client registration module 42 is adapted to receive and process registration messages from clients desiring to receive event messages from the push client. Namely, the client registration module 42 stores information of clients in the database 41.

The event processing module 43 is adapted to analyze an event message sent from the push server module and transfer the event message to an appropriate client as a result of the analysis. That is, the event processing module 43 determines a client to which the event message will be sent, on the basis of the information stored in the database 41.

The wireless Internet client 110 employs a browser capable of receiving push messages from the wireless push client 112. The browser of the client 110 receives Web contents for a wireless Internet network from the wireless push client 112 and shows the received Web contents to the user.

Figure 3:
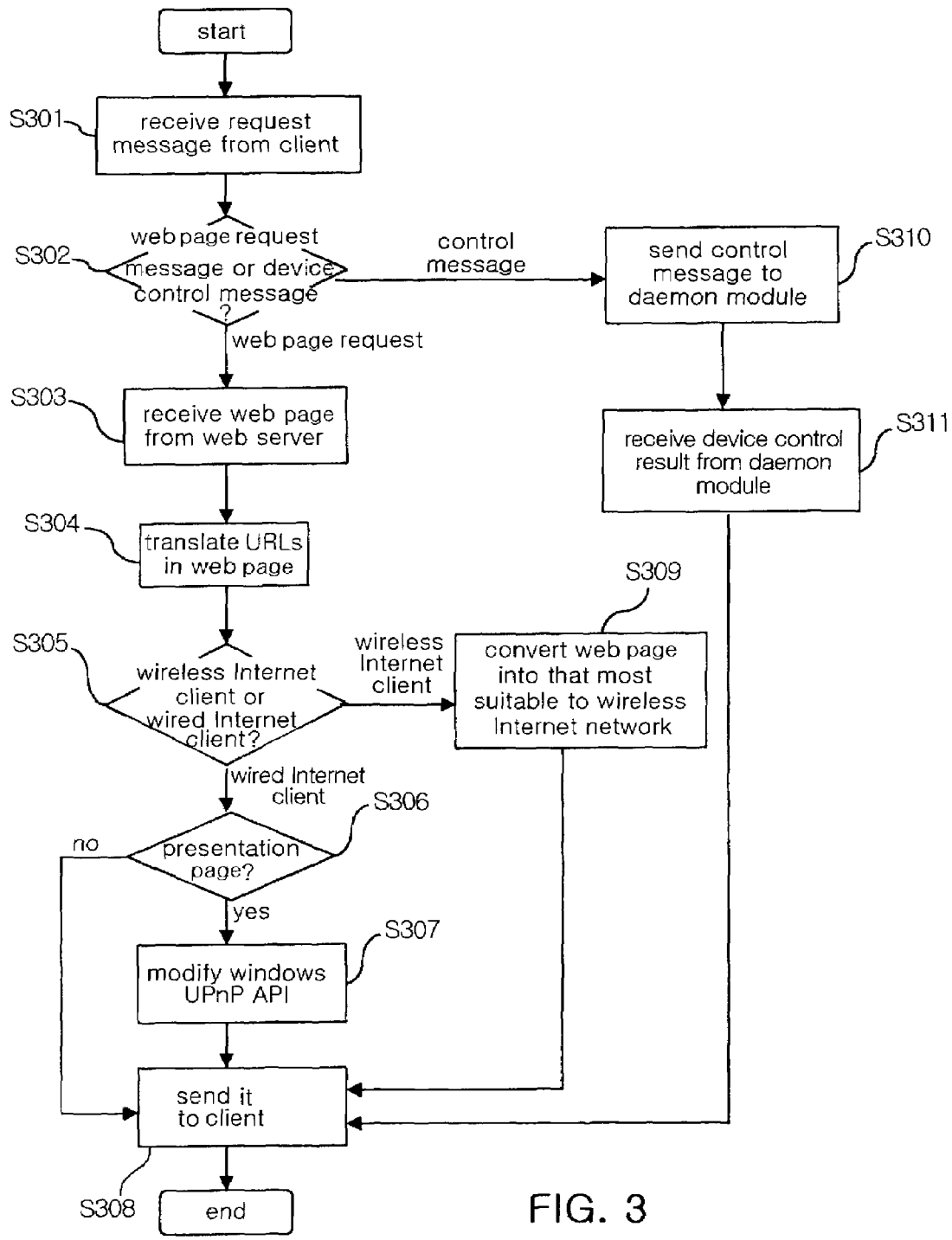
FIG. 3 is a flow chart illustrating the operation of a CGI module of an agent in accordance with the present invention.
Figure 4:
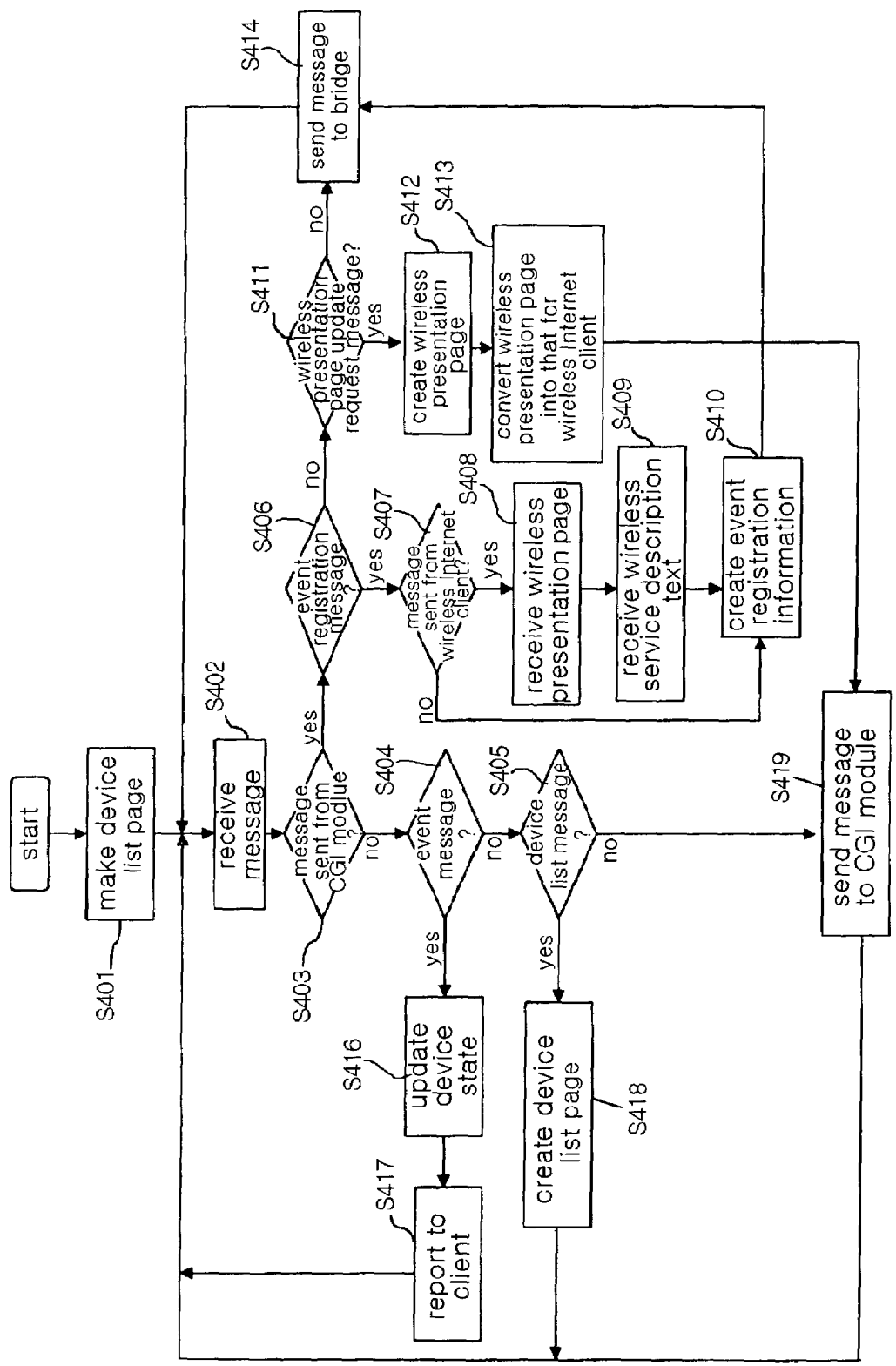
FIG. 4 is a flow chart illustrating the operation of a daemon module of the agent in accordance with the present invention.

FIGS. 3 and 4 illustrate the operation of the agent in accordance with the present invention. In a preferred embodiment of the present invention, the agent is composed of two modules, a CGI module and a daemon module. FIG. 3 is a flow chart illustrating the operation of the CGI module and FIG. 4 is a flow chart illustrating the operation of the daemon module.

First, the operation of the CGI module will be described with reference to FIG. 3. First, the CGI module receives a request message from a client (S301) and analyzes the received request message to determine whether it is a general Web page request message or a device control message (S302). If the received request message is determined to be a device control message at step S302, the CGI module sends it directly to the daemon module (S310). Thereafter, the CGI module receives a device control result from the daemon module and sends it to the client (S311).

In the case where it is determined at the above step S302 that the request message from the client is a Web page request message, the CGI module receives a Web page from an associated or different Web server (S303). Subsequently, the CGI module translates all URLs in the received Web page so that the client can continuously request Web pages via the CGI module (S304). At this time, the translated URLs may be URLs of different Web pages, URLs of images, etc.

Subsequently, the CGI module acquires information of the client from the client management module 14 in FIG. 2 and determines from the acquired information whether the client is a wireless Internet client or a wired Internet client (S305). Upon determining at step S305 that the client is a wireless Internet client, the CGI module translates the received Web page into a Web page most suitable to a wireless Internet network through the use of the contents translator 13 in FIG. 2 (S309) and sends the translated Web page to the wireless Internet client (S308). Alternatively, if the client is determined to be a wired Internet client at step S305, the CGI module determines whether the received Web page is a presentation page (S306). If the received Web page is a presentation page, the CGI module modifies factors for an existing Windows UPnP API into those for an API of the stub 102 (S307) and then sends the received Web page to the client (S308). In the case where the received Web page is not a presentation page, the CGI module sends the received Web page directly to the client (S308).

Next, the operation of the daemon module will be described with reference to FIG. 4. First, the daemon module receives a device list from the bridge 132 and makes it into a Web page interpretable by a client in advance (S401). Then, the daemon module waits for a message to be sent from a different module or program. Upon receiving a message from a different module or program (S402), the daemon module analyzes the received message to determine whether it has been sent from the CGI module (S403). If the received message is determined to have been sent from the CGI module at step S403, the daemon module recognizes that the received message is a device control message, and then determines whether the device control message is an event registration message (S406). If it is determined at step S406 that the device control message is an event registration message, the daemon module determines whether the event registration message has been sent from a wireless Internet client (S407) Upon determining at step S407 that the event registration message has been sent from a wireless Internet client, the daemon module receives and stores a wireless presentation page and wireless service description text for the wireless Internet client from a Web server associated with a device to be controlled by the client (S408 and S409). Thereafter, the daemon module creates and stores event registration information of the client (S410) and then sends the event registration message to the bridge (S414). In the case where it is determined at the above step S407 that the event registration message has been sent from a wired Internet client, not a wireless Internet client, the daemon module creates only event registration information (S410) and then sends the event registration message to the bridge (S414).

On the other hand, if it is determined at the above step S406 that the device control message sent from the CGI module is not an event registration message, the daemon module proceeds to step S411 to determine whether the device control message is a wireless presentation page update request message. In the case where the device control message is determined to be a wireless presentation page update request message at step S411, the daemon module creates a newest wireless presentation page on the basis of device information stored therein and a wireless presentation page for the wireless Internet client of the UPnP devices in the home network (S412) and translates the created newest wireless presentation page into that for the wireless Internet client through the use of the contents translator 13 in FIG. 2 (S413). Subsequently, the daemon module sends the translated presentation page to the CGI module so that the client can have the newest presentation page (S419). However, in the case where the device control message sent from the CGI module is determined not to be a wireless presentation page update request message at the above step S411, the daemon module sends the device control message directly to the bridge 132 (S414).

On the other hand, in the case where it is determined at the above step S403 that the received message has not been sent from the CGI module, the daemon module recognizes that the received message has been sent from the bridge 132 and then determines whether the received message is an event message (S404). If the received message is determined to be an event message at step S404, the daemon module determines whether a presentation page for a wireless Internet client of a device corresponding to the event message is present therein, so as to modify device information therein into a new device state value (S416). Thereafter, the daemon module searches the client management module 14 in FIG. 2 for a client whose event has been registered therein, and then sends the event message directly to the searched client if this is a wired Internet client and informs the searched client that the presentation page has been updated, if this is a wireless Internet client (S417). Alternatively, in the case where it is determined at the above step S404 that the message sent from the bridge is not an event message, the daemon module determines whether the sent message is a device list message (S405). If the sent message is a device list message, the daemon module recognizes that a new device has been connected to the home network or an existing device has been disconnected from the home network, and then creates a new device list Web page based on the device list message (S418). To the contrary, if the message sent from the bridge is not a device list message, the daemon module recognizes that the sent message is a control result message, and then transfers the sent message to the CGI module (S419).

Figure 5:
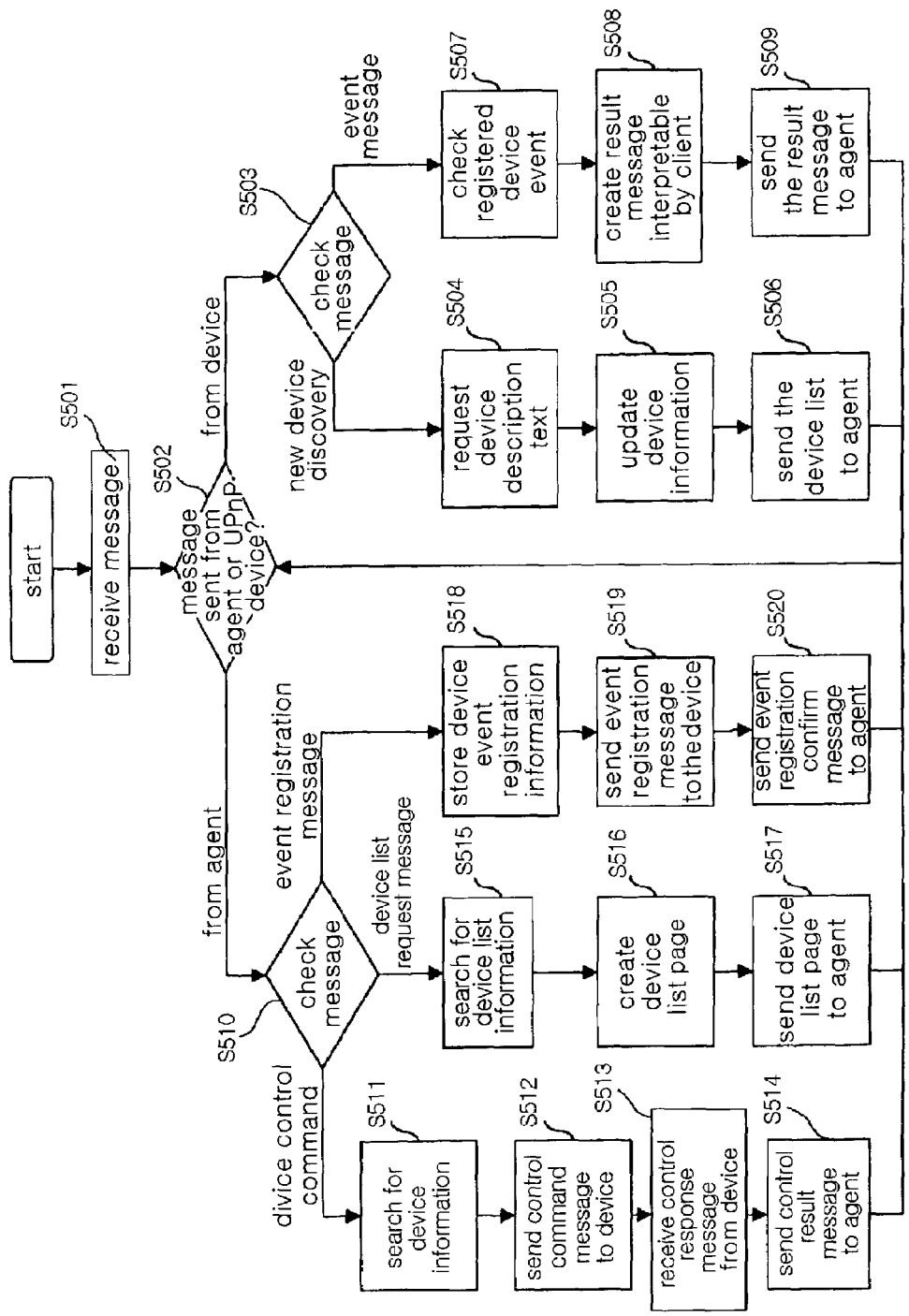
FIG. 5 is a flow chart illustrating the operation of a bridge in accordance with the present invention.

FIG. 5 is a flow chart illustrating the operation of the bridge in accordance with the present invention. As stated previously, the bridge 132 communicates with the UPnP devices over the home network 140 according to a UPnP protocol. Namely, the bridge 132 sends control messages to the UPnP devices to control them, and receives control results from the UPnP devices. This bridge operation will hereinafter be described in more detail with reference to FIG. 5.

In operation, the bridge 132 receives a message from the agent 131 or a specific one of the UPnP devices 150 in the home network (S501). The bridge 132 then determines which one of the agent 131 and specific UPnP device has sent the received message (S502). If the received message is determined to have been sent from the specific UPnP device at step S502, the bridge 132 proceeds to step S503. However, in the case where the received message is determined to have been sent from the agent 131 at step S502, the bridge 132 proceeds to step S510.

In the case where the received message has been sent from the specific UPnP device, the bridge 132 checks the received message to determine whether it is a new device advertisement message (S503). If the received message is a new device advertisement message, the bridge 132 requests and receives a device description text from the specific UPnP device (S504), updates its device information with the received device description text (S505) and then sends a device list to the agent to inform it that a new device has been discovered (S506). In the case where the message received from the specific UPnP device is a device event message, the bridge 132 checks the specific UPnP device to determine whether it has been registered therein (S507). Upon determining that the specific UPnP device has been registered, the bridge 132 newly creates a result message interpretable by an associated client (S508) and sends the created result message to the agent (S509).

On the other hand, in the case where it is determined at the above step S502 that the received message has been sent from the agent 131, the bridge 132 checks the received message at step S510. As a result of the message checking, the bridge 132 proceeds to step S511, S515 or S518. That is, if the message received from the agent 131 is determined to be a device list request message at step S510, the bridge 132 searches the device management module 21 in FIG. 2 for device list information (S515), creates a device list page on the basis of the searched device list information (S516) and sends it to the agent (S517). If the message received from the agent 131 is determined to be an event registration message at step S510, the bridge 132 stores device event registration information in the device management module 21 in FIG. 2 (S518) and then sends the event registration message to an associated one of the UPnP devices 150 in the home network (S519). If the event registration has been normally processed, the bridge 132 creates an event registration confirm message and sends the created confirm message to the agent to inform an associated client that the event registration has been normally processed (S520). In the case where the message received from the agent 131 is determined to be a device control command message at step S510, the bridge 132 searches for information of an associated one of the UPnP devices 150 in the home network (S511) and sends the control command message to the associated UPnP device through the device management module 21 and UPnP API 24 in FIG. 2 (S512). Thereafter, upon receiving a control response message from the associated UPnP device (S513), the bridge 132 creates a control result message and sends it to the agent (S514).

Figure 6:
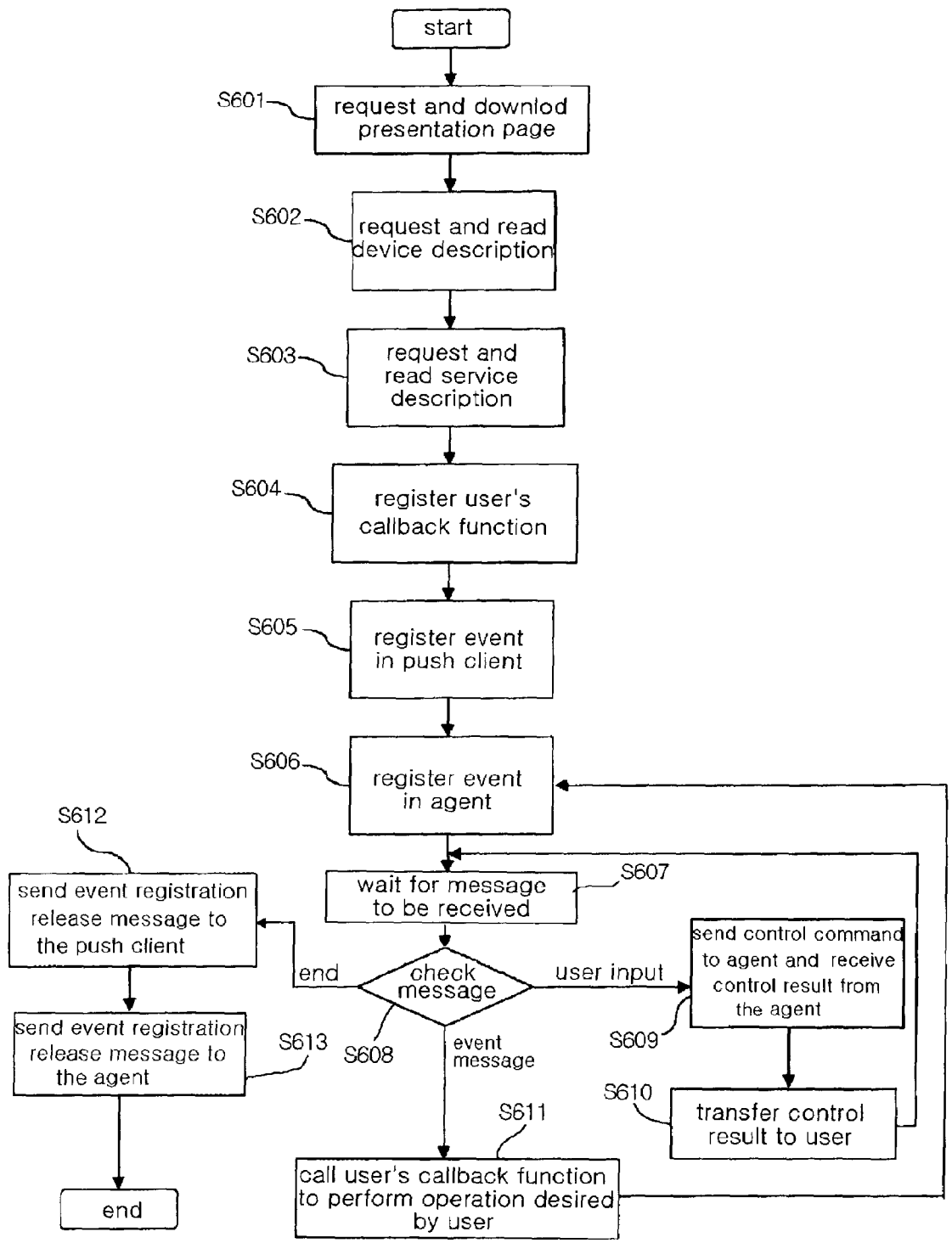
FIG. 6 is a flow chart illustrating the operation of a stub in accordance with the present invention.

FIG. 6 is a flow chart illustrating the operation of the stub in accordance with the present invention.

First, if the user requests a presentation page and downloads it to the browser (S601), then the stub 102 is automatically created. The created stub 102 first requests and reads a device description and service description of each of the UPnP devices 150 in the home network from the agent 131 (S602 and S603). The stub 102 registers the user's callback function for an event (S604) and then registers the event respectively in the push client and agent (S605 and S606). If the event registration is completed, then the stub 102 becomes ready to control the devices, and it can recognize a device state upon receiving an event message.

Subsequently, the stub 102 waits for a message to be received (S607). If the user inputs a control command message (S608), the stub 102 generates a control command corresponding to the inputted control command message, sends it to the agent 131 and receives a control result from the agent 131 (S609). The stub 102 then transfers the received control result to the user (S610). However, upon receiving an event message at step S608, the stub 102 calls the callback function registered by the user to perform an operation desired by the user (S611).

On the other hand, if the user ends a program at step S608, the stub 102 sends an event registration release message to each of the agent and push client (S612 and S613), so as to end the entire control operation.

Figure 7:
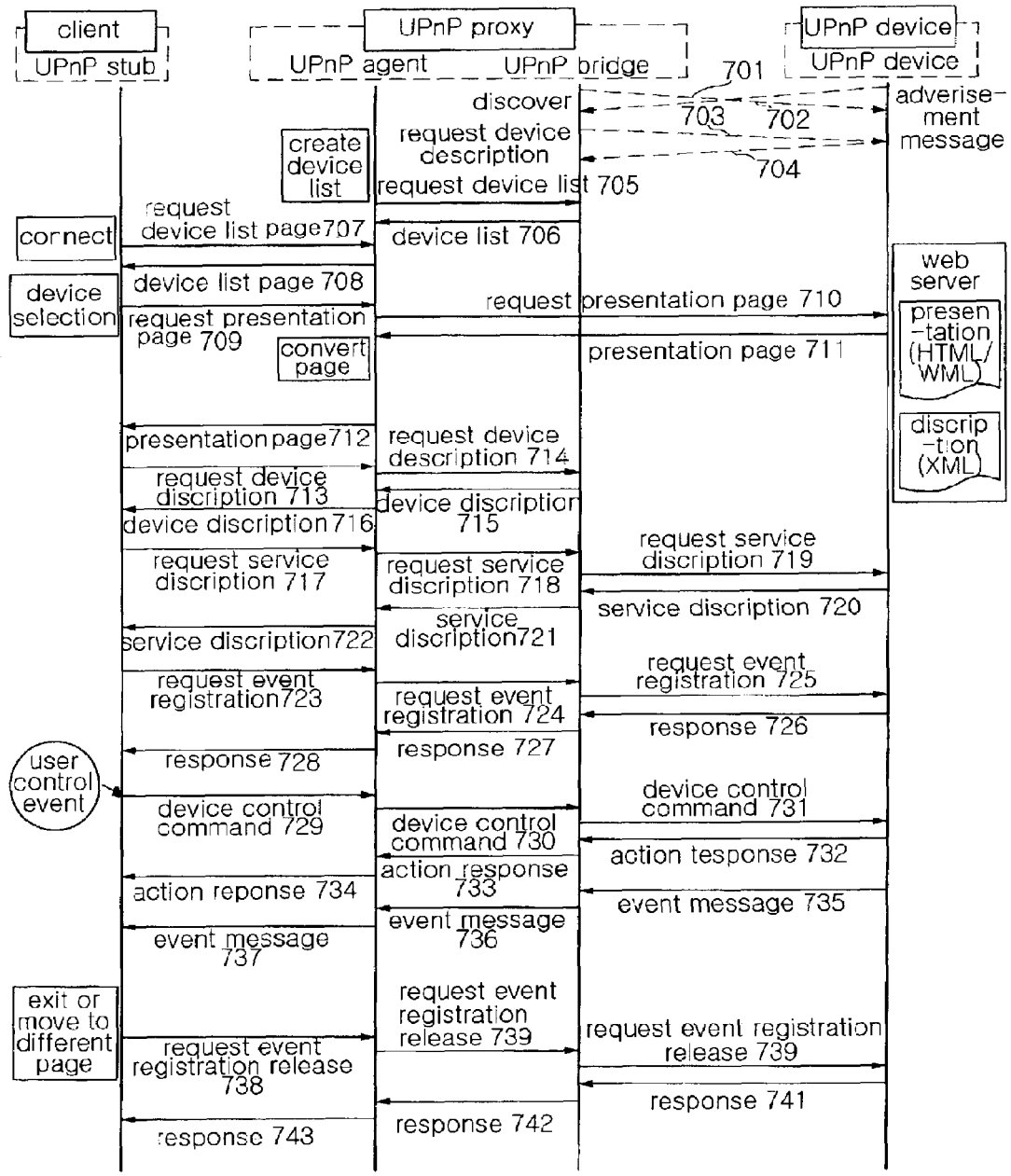
FIG. 7 is a view illustrating a message flow of the UPnP proxy system for a wired Internet client in accordance with the present invention.

FIG. 7 is a view illustrating a message flow of the UPnP proxy system for the wired Internet client 100 in accordance with the present invention. With reference to FIG. 7, when the bridge 132 is connected to the home network, it discovers the UPnP devices 150 (701), receives advertisement messages therefrom (702), and requests and receives device descriptions therefrom (703 and 704).

The agent 131 requests and receives a device list from the bridge 132 (705 and 706) to create a device list page. If the stub 102 is created in the wired Internet client 100 and connected to the agent 131, then it requests and receives the device list page from the agent 131 (707 and 708). Thereafter, the stub 102 selects a specific one of the UPnP devices 150, to be controlled by the user, and requests a presentation page from the agent 131 (709). Then, the agent requests and receives the presentation page from the specific UPnP device and transfers it back to the stub 102 (710, 711 and 712).

It should be noted that the stub 102 created in the wired Internet client 100 first requires a device description and service description of a specific UPnP device to control the device. This requirement is made for acquiring device information and recognizing actions provided by an associated service. In order to acquire the device description and service description of the specific UPnP device, the stub 102 requests the service description from the agent 131 (713), which then requests the device description from the bridge 132 (714). As stated previously, when the specific UPnP device is connected to the home network, the bridge 132 requests the device description from the specific UPnP device and stores it therein. As a result, when the agent 131 requests the device description (714), the bridge 132 sends the device description stored therein to the agent 131 (715), which then sends it to the stub 102 (716). But, the bridge 132 does not have the service description. In this regard, upon receiving a service description request message from the stub 102 (717), the agent 131 sends the received message to the bridge 132 (718), which then transfers it to the specific UPnP device (719). In response to the service description request message transferred from the bridge 132, the specific UPnP device sends the service description to the bridge 132 (720), which then transfers it to the agent 131 (721). Subsequently, the agent 131 sends the service description transferred from the bridge 132 to the stub 102 (722).

Thereafter, in order to receive an event message of the specific UPnP device, the stub 102 sends an event registration request message associated with a service described in the device description to the agent 131 (723), which then transfers the event registration request message to the bridge 132 (724). The bridge 132 sends the event registration request message to the specific UPnP device using a GENA, which is one of UPnP protocols (725). In response to the event registration request message sent from the bridge 132, the specific UPnP device performs its event registration and then transfers an event registration result to the bridge 132 (726). The bridge 132 sends an event registration result message to the agent (727), which then transfers it to the stub 102 (728). As a result of the event registration in this manner, the stub 102 becomes ready to control and monitor the specific UPnP device, and waits for a device control command from the user.

If the user inputs a device control command through an API of the stub which is used in the same way as a Windows UPnP API, the inputted device control command is sent at steps 729, 730 and 731. An action response message and an event message are sent as a result of execution of the inputted device control command (732, 733, 734, 735, 736 and 737). The action response message sent at steps 732, 733 and 734 is a message which is created in response to an action request message and has an output factor. The event message sent at steps 735, 736 and 737 is a message which is created due to a change in device state parameter.

On the other hand, when the user closes the Internet explorer or moves to a different page because he/she has no need to control the specific UPnP device any longer, the stub 102 sends an event registration release message to the agent 131 (738). Then, the agent 131 transfers the event registration release message to the bridge 132 (739), which in turn sends it to the specific UPnP device (740). A response message is sent from the specific UPnP device to the stub as a result of execution of the event registration release message (741, 742 and 743). The stub 102 receives no further event message associated with the service of the specific UPnP device by sending and receiving the event registration release message and the result message.

Figure 8:
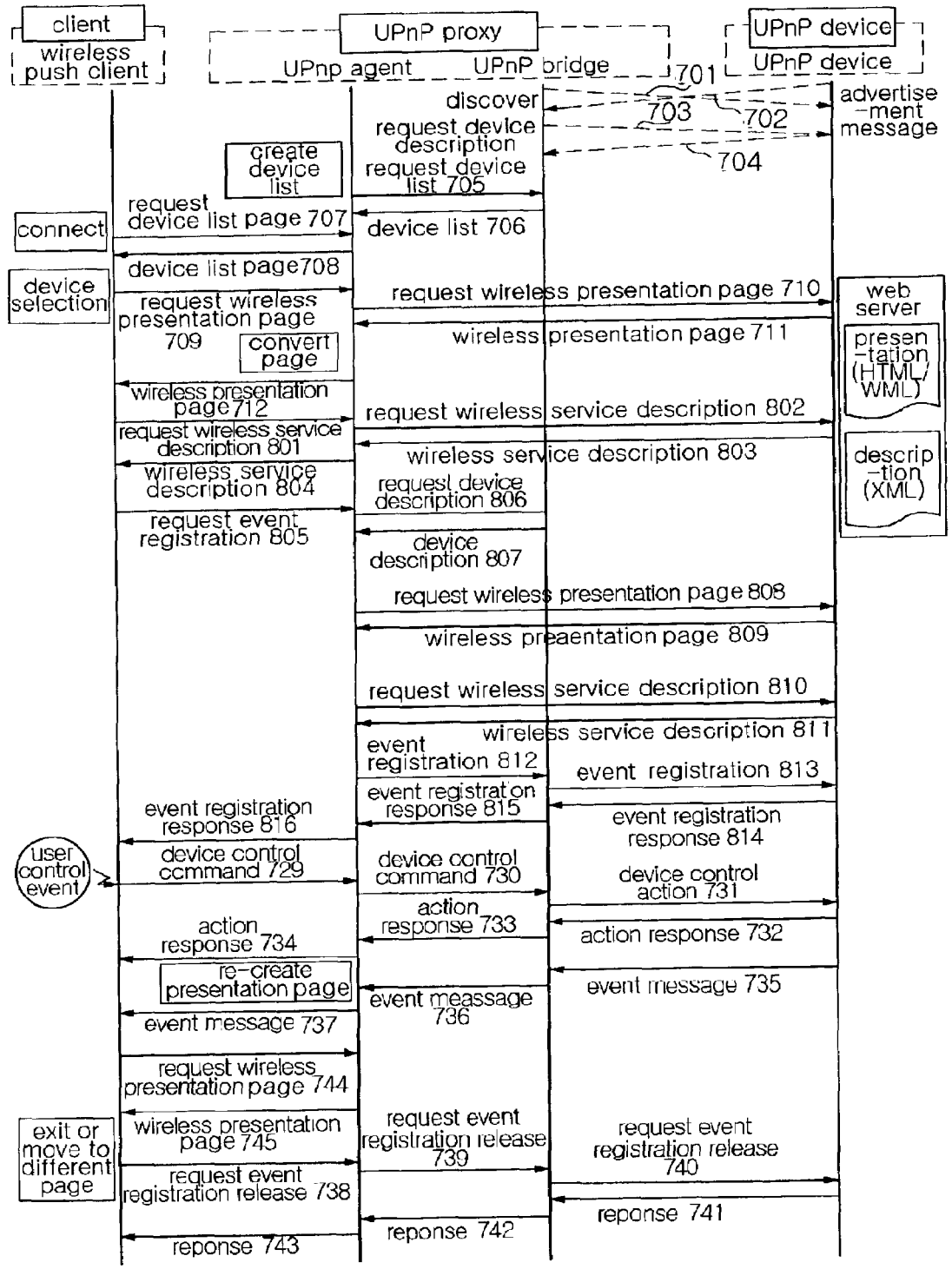
FIG. 8 is a view illustrating a message flow of the UPnP proxy system for a wireless Internet client in accordance with the present invention.

FIG. 8 is a view illustrating a message flow of the UPnP proxy system for the wireless Internet client 110 in accordance with the present invention. The message flow of FIG. 8 is similar to that of FIG. 7. Therefore, a description of the same parts as those of FIG. 7 will be omitted and only a description of other parts which are different from those of FIG. 7 will hereinafter be given with reference to FIG. 8. The wireless push client 102 sends a wireless presentation page request message to the agent 131 (801), which then sends it to the specific UPnP device (802). Thereafter, the agent 131 receives a wireless presentation page from the specific UPnP device (803) and sends it back to the wireless push client 112 (804).

Note that a more complex procedure is required for the user to control the specific UPnP device using a wireless Internet browser which is a wireless Internet user interface. Whenever an event message is generated due to a change in state parameter of the specific UPnP device, the agent 131 must update a wireless presentation page and store the updated wireless presentation page therein to send it to the browser. The text update and storage are made when an event registration request message is sent from the client. In other words, if the wireless push client 112 sends an event registration request message to the agent (805), the agent requests and receives a device description from the bridge (806 and 807). Also, the agent requests and receives a wireless presentation page and wireless service description from the specific UPnP device (808, 809, 810 and 811). Thereafter, the agent transfers the event registration request message to the bridge (812). The bridge registers an event with respect to the specific device (813) and receives a registration result message from the specific device (814). Subsequently, the bridge sends an event registration confirm message to the agent (815), which then transfers it to the wireless push client (816).

Upon receiving an event message from the bridge (735 and 736), the agent creates a wireless presentation page newly updated on the basis of the received message, and then informs the wireless Internet client that an event has occurred (737). Subsequently, the client requests and receives the new presentation page from the agent (744 and 745).

As apparent from the above description, according to the present invention, a user can control and manage UPnP devices in a home network using a wired/wireless Internet client on an external Internet network which exists outside of the home network. Moreover, cost and time overlap can be reduced in controlling and managing the UPnP devices.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for managing and controlling UPnP devices in a home network over an external Internet network, comprising a client connected to the external Internet network, and a UPnP proxy server for controlling and managing the UPnP devices in the home network, wherein said client includes:
   a stub for providing the same application program interface (API) as a UPnP API to a user, managing information of said UPnP devices, and processing a device control command from the user; and
   a push client for transferring said device control command processed by said stub to said UPnP proxy server and an event message from said UPnP proxy server to said stub, respectively; and
   wherein said UPnP proxy server includes:
   a bridge for managing said UPnP devices in said home network and controlling a specific one of said UPnP devices in response to said device control command from said client; and
   an agent for transferring said device control command from said client to said bridge and a result of execution of said device control command and said event message from said bridge to said client, respectively.

2. The apparatus according to claim 1, wherein said stub includes:
   a user API section for transferring the same results as those in a UPnP API provided to said user, processing said device control command from said user and transferring the processed control command to said agent;
   a message processing section for conducting communications between said push client and said agent, analyzing a message sent thereto and transferring the sent message according to a corresponding function as a result of the analysis;
   a device database section for, when said user desires to control said specific UPnP device, requesting and storing a device description and service description of said specific device from said agent;
   an interface managing section for managing an interface created by said user; and
   an event processing section for analyzing said event message transferred from said push client, calling a callback function registered by said user and processing event information generated in said specific device in accordance with the analysis result and the called callback function.

3. The apparatus according to claim 1, wherein said push client includes: a message processing section for conducting communications with said agent and stub, analyzing a message sent from said agent or stub thereto and transferring the sent message according to a corresponding function as a result of the analysis;
   a client registration section for receiving a registration message from a client desiring to receive said event message and registering the desiring client in a database on the basis of the received registration message; and
   an event processing section for analyzing said event message transferred from said agent, extracting only information desired by said stub therefrom and sending the extracted information to said client registered in said database.

4. The apparatus according to claim 1, wherein said bridge includes: a message processing section for conducting communications with said agent and said UPnP devices in said home network, analyzing a message sent thereto and transferring the sent message according to a corresponding function as a result of the analysis;
   a device managing section for receiving description texts from said UPnP devices in said home network, storing the received description texts in a structural manner, receiving advertisement messages from said UPnP devices and managing a device list on the basis of the received advertisement messages;
   a control processing section for receiving said device control command from said client through said agent and controlling said specific UPnP device in. response to the received control command; and
   an event processing section for registering an event with respect to said specific UPnP device in response to an event registration message from said agent and transferring said event message from said specific UPnP device to said agent.

5. The apparatus according to claim 1, wherein said agent includes: a message processing section for transferring a message sent from said client to said bridge according to a corresponding function and transferring a message sent from said bridge to said client;
   a push server for transferring said event message from said bridge to said push client;
   an event registration section for receiving an event registration message from said client and analyzing and storing information of said client on the basis of the received event registration message; and
   a contents translator for receiving a device list from said bridge in response to a change in state of each of said UPnP devices in said home network, translating the received device list into a Web page, sending the translated Web page to said client and translating a Web page for a wired Internet network into that for a wireless Internet network.

* * * * *